United States Patent [19]

Chan et al.

[11] Patent Number: 4,822,274
[45] Date of Patent: Apr. 18, 1989

[54] HYDRAULIC CLAMPING UNIT FOR A MOLDING APPARATUS

[76] Inventors: Harry Chan, 89 Larkin Ave., Markham, Ontario, Canada, L3P 4R1; Basilio Yi, 35 Hoover Dr., Thornhill, Ontario, Canada, L3T 5M6

[21] Appl. No.: 146,265

[22] Filed: Jan. 20, 1988

[51] Int. Cl.$^4$ .................. B29C 45/67; B29C 49/56
[52] U.S. Cl. .................. 425/450.1; 425/451.2; 425/541; 425/589; 425/590; 425/DIG. 223
[58] Field of Search .......... 425/450.1, 451, 451.2, 425/541, 589, 590, DIG. 221, DIG. 223; 264/526

[56] References Cited

U.S. PATENT DOCUMENTS

| | | | |
|---|---|---|---|
| 2,416,406 | 2/1947 | Roehri | 425/450.1 |
| 2,807,050 | 9/1957 | Roger | 425/450.1 |
| 2,916,768 | 12/1959 | Quere et al. | 425/451.23 |
| 3,078,508 | 2/1963 | Martin, Jr. | 264/526 |
| 3,078,515 | 2/1963 | Wintriss | 425/450.1 X |
| 3,172,155 | 3/1965 | Wenzel | 425/450.1 X |
| 3,344,470 | 10/1967 | Hufford | 425/450.1 X |
| 3,687,590 | 8/1972 | Cyriax | 425/450.1 X |
| 3,951,579 | 4/1976 | Myers et al. | 425/450.1 X |
| 3,989,437 | 11/1976 | Kiefer et al. | 425/450.1 X |
| 4,005,974 | 2/1977 | Szabo | 425/DIG. 223 |
| 4,106,885 | 8/1978 | Poncet | 425/451.2 X |
| 4,191,523 | 3/1980 | Niederst et al. | 425/450.1 X |

FOREIGN PATENT DOCUMENTS 46-9662 11/1971 Japan .................. 425/450.1
52-25429 7/1977 Japan .................. 425/450.1

OTHER PUBLICATIONS

Society of the Plastics Industry, Plastics Engineering Handbook of the Society of the Plastics Industry, Inc., New York, Van Nostrand Reinhold Co., 1976, pp. 87–90, 102–103.
Ed Galli, Drumming up New Business in Large Blow-molded Containers, Plastics Machinery and Equipment, Oct. 1986, p. 22.
Michael Yahr, Extrusion Blow-molding, Modern Plastics Encyclopedia, 1983–84, p. 179.
Harold Faig, Injection Molding Thermoplastics, Modern Plastics Encyclopedia, 1983–1984, p. 268.

Primary Examiner—Richard L. Chiesa

[57] ABSTRACT

A hydraulic clamp unit for a molding apparatus has a pair of opposed complimentary mold halves attached accordingly to a pair of opposed platens suspended on roller guides and moving toward each other into engagement of the mold halves to form a mold cavity surrounding a molded article of a thermoplastic material. The unit is provided with main clamp cylinders of a pull type and having piston rod chambers pressurized to exert pressure on the platens during formation of the article. Rapid movement of the platens is achieved by means of kicker cylinders having piston chambers and piston rod chambers communicating with each other. The main cylinders are locked to one of the platens by means of hydraulic mechanisms.

4 Claims, 1 Drawing Sheet

HYDRAULIC CLAMPING UNIT FOR A MOLDING APPARATUS

BACKGROUND OF THE INVENTION

This invention relates to hydraulic clamping units of blow molding and injection molding apparata for fabrication of thermoplastic articles.

In the injection molding method, a heat-softened plastic material is forced from a cylinder into a mold cavity under hydraulic pressure of the plastic.

In the blow molding method, a warm plastic parison (hollow tube) is formed either by injection molding (injection blow molding process), or by an extruder (extrusion blow molding process), is placed between two halves of a mold and is assumed the shape of a cavity of the mold under air pressure inside the parison.

Known hydraulic clamping units (for example, U.S. Pat. No. 3,078,508; Society of the Plastics Industry. Plastics Engineering Handbook of the Society of Plastics Industry, Inc. New York, Van Nostrand Reinhold Co., 1976, pp. 87–90, 102–103; Ed Galli. Drumming up New Business in Large Blowmolded Containers. Plastics Machinery and Equipment, October, 1986, p. 22) include a pair of opposed complimentary mold halves attached accordingly to a pair of opposed platens, at least one of which is moveable toward another into engagement of the mold halves to form a mold cavity which surrounds a molded article of a thermoplastic material, said moveable platen being connected to one of two ends of at least one hydraulic cylinder exerting pressure on the platens to keep the mold halves closed during formation of the article.

Herein the hydraulic clamping unit means a full hydraulic unit actuated by a hydraulic cylinder which is directly connected to the moving platen. This is in contrast to a hydromechanic unit which also has a hydraulic cylinder, but the latter is connected to the platen not directly, but by means of a toggle mechanism.

One disadvantage of the known units lies in the use of a push-type clamp cylinders attached between the moving platen and a frame member. This arrangement requires relatively large diameters of the piston rods of the cylinders and large frame members to withstand high hydraulic pressure.

In blow molding and large injection molding apparata, another drawback is large hydraulic capacities. This is overcome in so-called lock-and-block units (see the above-cited handbook, pp. 102–103) wherein a small-diameter high-speed rapid traverse kicker cylinder is used in addition to the main clamp cylinder. At the end of a stroke of the kicker cylinder, a hydromechanical locking mechanism is employed to lock the main clamp cylinder. In these units, the kicker cylinder and the main cylinder are installed in-line, with high loads transmitted to all other components of the units. Also, the kicker cylinder therein still requires a relatively high capacity of the hydraulic system.

Further drawback of the known clamping units with kicker cylinders lies in having only one platen moving and thus causing vibration. It should be mentioned that units with both platens moving are known (Michael Yahr. Extrusion-blow Molding. Modern Plastics Encyclopedia, 1983–84, p. 179). However, this unit does not have kicker cylinders.

Finally, most known units have platens sliding in tie rods, which results in extensive wear.

SUMMARY OF THE INVENTION

The objective of the present invention is to overcome the above drawbacks of the known hydraulic clamp units. This objective is achieved by the following improvements.

To avoid high loads exerted outside the platens and to prevent buckling of the main clamp cylinder, the second end of the latter is connected to the second platen, the cylinder being of a pull type and having a piston rod chamber pressurized to exert pressure on the platens.

In order to avoid unwieldiness of the unit, the moveable platen is connected to a relatively small-diameter long-stroke high-speed rapid traverse kicker cylinder, the clamp cylinder being relatively large-diameter short-stroke low-speed cylinder and the connection of the latter to the second platen being achieved by means of a locking mechanism operating at the end of the stroke of said kicker cylinder.

The locking mechanism includes a pair of opposite complimentary locking plates attached to the moveable platen, at least one of the plates being moveable toward another plate into engagement with the clamp cylinder by means of at least one locking cylinder.

The second plate is made moveable by another locking cylinder, both the locking cylinders being located opposite to each other about the clamp cylinder (two locking cylinders are known from Harold Faig. Injection Molding Thermoplastics. Modern Plastics Encyclopedia, 1983–84, p. 268).

To avoid movement of large unbalanced masses and vibration, the second platen is made moveable toward the first platen and is connected to a second relatively small-diameter long-stroke high-speed rapid traverse kicker cylinder located opposite to the first kicker cylinder.

In order to decrease hydraulic capacity of the kicker cylinder, the latter has a piston chamber and a piston rod chamber communicating with each other to close the halves.

Finally, platens are suspended on roller guides moving on rails of the frame members, and the plates are provided with roller guides moving in parallel slots.

A more complete appreciation of the present invention and the distinguishing characteristics, objectives and attendant advantages thereof set out herein are more apparent and obvious to one ordinary skilled in the art from the following detailed description, drawings and appended claims.

DESCRIPTION OF THE PREFERRED EMBODIMENT

Figure 1:
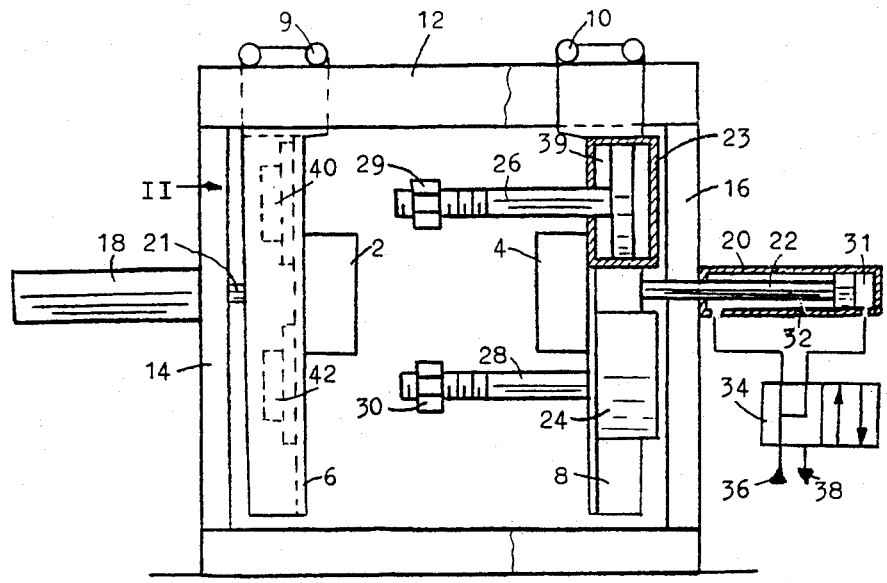
FIG. 1 is a front view of the clamping hydraulic unit of the present invention, adapted particularly for a blow molding apparatus, with a fragmentary vertical sectional view.

Referring now to the drawings wherein like reference characters assignate like or corresponding parts throughout the several views, the unit of the present invention includes a pair of opposed complimentary mold halves 2 and 4 (shown open in FIG. 1) attached to a pair of opposed platens 6 and 8. The platens are suspended on roller guides 9 and 10 moving along horizontal rails 12 welded to upstanding frame members 14 and 16.

The unit has two kicker cylinders 18 and 20 mounted on the members 14 and 16, piston rods 21 and 22 of these cylinders being connected to the platens 6 and 8. One of the platens (8) has two main clamp hydraulic cylinders 23 and 24 with free-ended threaded piston rods 26 and 28 bearing nuts 29 and 30.

The kicker cylinders 18 and 20 are small-diameter, long-stroke and high-speed, whereas the main clamp cylinders 23 and 24 are large-diameter, short-stroke and low-speed. The kicker cylinders 18 and 20 have their piston chamber 31 and rod piston chamber 32 communicating with each other via a valve 34 to close the mold halves 2 and 4 (in FIG. 1 only one of the kicker and main cylinders is shown in cross-section). The valve 34 is connected to a delivery line 36 and a discharge line 38.

The main cylinders 23 and 24 are of a pull type and have their piston rod chambers 39 pressurized to exert pressure on the platens 6 and 8.

Figure 2:
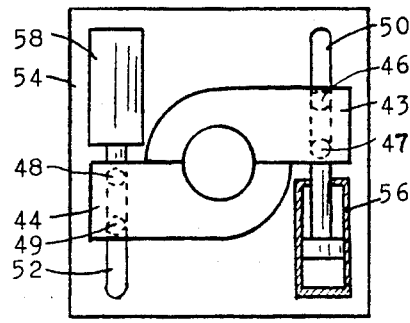
FIG. 2 is a view of a locking mechanism, along arrow II in FIG. 1.

The platen 6 is provided with hydromechanical locking mechanisms 40 and 42, each of them including a pair of opposite complimentary locking plates 43 and 44 (shown locked in FIG. 2) provided with rollers 46, 47, 48 and 49 moving in parallel slots 50 and 52 of a mounting base 54 by locking cylinders 56 and 58. The base 54 is attached to the platen 6. In FIG. 2 only one locking cylinder (56) is shown in cross-section.

In a blow mold operation, a parison is extruded from a nozzle located between the mold halves 2 and 4 (the nozzle is not shown in the drawings), the valve 34 being in the illustrated position. At this the kicker cylinders 18 and 20 move the platens 6 and 8 toward each other. Since the chambers 31 and 32 are interconnected, the effective area of the cylinder is equal to the area of the rod 22. That is why this movement is very rapid.

At the end of this stroke, the nuts 29 and 30 are beyond the plates 43 and 44 remaining in their open position. Then the latter are closed around the piston rods 26 and 28 by means of cylinders 56 and 58, and the chamber 39 is pressurized to exert pressure on the closed mold halves 2 and 4. As the pressure builds up, the forces are transmitted within the halve-platen-nut-plate-rod-piston-platen-halve zones, without any forces acting outside the platens 6 and 8. These forces stretch the rods 26 and 28, but do not load the frame members.

Now compressed air is delivered into the parison expanded into conformity with the mold cavity surrounded the parison (the cavity and parison are not shown).

Following completion of the expansion of the parison into the molded article, all the cylinders are operated in the reverse direction, the plates 43, 44, the platens 6, 8 and the mold halves 2, 4 being retracted.

It is to be understood that the clamping unit for blow molding described and presented for explanation is only examplary. Various modifications may be obviously resorted to by those skilled in the art without departing from the spirit and the scope of the present invention as set forth in the appended claims.

We claim:

1. A hydraulic clamping unit for a molding apparatus, the unit including:

a pair of opposed complimentary mold halves attached accordingly to a pair of opposed platens, at least one of which is moveable toward another into engagement of the mold halves to form a mold cavity which surrounds a molded article of a thermoplastic material;

at least one clamp hydraulic cylinder having two ends each of which is connected to the different platens for exerting pressure on the latter to keep the mold halves closed during formation of the article, the cylinder being of a pull type, having a piston rod chamber pressurized to exert said pressure on the platens;

at least one rapid traverse kicker cylinder connected to said moveable platen by means of a locking mechanism operating at the end of the stroke of said kicker cylinder and including a pair of opposite complimentary locking plates attached to said moveable platen, at least one of the plates being moveable toward another plate into engagement with the clamp cylinder by means of at least one locking cylinder.

2. The unit of claim 1 wherein in order to avoid movement of large unbalanced masses and vibration, the second platen is made moveable toward the first platen and is connected to a second rapid traverse kicker cylinder located opposite to the first kicker cylinder.

3. The unit of claim 1 wherein in order to decrease hydraulic capacity of the kicker cylinder, the latter has a piston chamber and a piston rod chamber communicating with each other to close the mold halves.

4. The unit of claim 1 wherein the plates are provided with roller guides moving in parallel slots.

* * * * *